(12) United States Patent
Kagehiro et al.

(10) Patent No.: US 7,899,233 B2
(45) Date of Patent: Mar. 1, 2011

(54) SYSTEM AND METHOD FOR TRACING BANK NOTES

(75) Inventors: Tatsuhiko Kagehiro, Kokubunji (JP); Hiroto Nagayoshi, Kokubunji (JP); Hiroshi Sako, Shiki (JP); Toshiro Uemura, Nisshin (JP); Yuji Nagaya, Seto (JP)

(73) Assignee: Hitachi-Omron Terminal Solutions Corp., Tokyo (JP)

( * ) Notice: Subject to any disclaimer, the term of this patent is extended or adjusted under 35 U.S.C. 154(b) by 582 days.

(21) Appl. No.: 10/715,367

(22) Filed: Nov. 19, 2003

(65) Prior Publication Data
US 2004/0260649 A1  Dec. 23, 2004

(30) Foreign Application Priority Data
Jun. 17, 2003  (JP) ................................ 2003-171476

(51) Int. Cl.
*G06K 9/00*   (2006.01)
*G06Q 40/00*  (2006.01)

(52) U.S. Cl. ........................ 382/135; 382/190; 235/379

(58) Field of Classification Search .......... 382/135–140, 382/209; 235/379; 705/43; 902/7
See application file for complete search history.

(56) References Cited

U.S. PATENT DOCUMENTS

| | | | |
|---|---|---|---|
| 4,254,399 A |  | 3/1981 | Burkhardt et al. |
| 5,649,115 A | * | 7/1997 | Schrader et al. ............... 705/33 |
| 5,870,487 A | * | 2/1999 | Graves et al. ................ 382/135 |
| 6,065,672 A | * | 5/2000 | Haycock ...................... 235/379 |
| 6,181,812 B1 | * | 1/2001 | Rodite ......................... 382/135 |
| 6,981,637 B2 | * | 1/2006 | Nagayoshi et al. ........... 235/379 |
| 7,003,162 B2 |  | 2/2006 | Ohashi |
| 2001/0040993 A1 | * | 11/2001 | Herley et al. ................. 382/135 |
| 2002/0136457 A1 | * | 9/2002 | Onishi et al. ................. 382/209 |
| 2003/0021459 A1 | * | 1/2003 | Neri et al. .................... 382/135 |
| 2003/0059098 A1 | * | 3/2003 | Jones et al. .................. 382/135 |
| 2003/0085271 A1 | * | 5/2003 | Laskowski ................... 235/379 |

(Continued)

FOREIGN PATENT DOCUMENTS
DE   2813157   3/1978

(Continued)

OTHER PUBLICATIONS

EZB Rahmenvereinbarung vom, bereitgeestat unter www.Ecb.int/pub/pdf/other/cashrecyclingter.msde.pdf (E2), May 24, 2002, in German.

(Continued)

*Primary Examiner* — Vu Le
*Assistant Examiner* — Andrae S Allison
(74) *Attorney, Agent, or Firm* — Mattingly & Malur, P.C.

(57) ABSTRACT

A system and method are provided for tracing bank notes or, specifically, counterfeit money. In one example of the tracing system, an automatic teller machine (ATM) electronically connected to one or more devices is provided. The one or more devices comprise a deposit device configured to receive an initial bank note; an image extraction device configured to extract one or more initial images from the initial bank note; a transaction log device configured to attach a transaction log to the one or more initial images, wherein the deposit device is further configured to receive a subsequent bank note, wherein the image extraction device is further configured to extract one or more subsequent images from the subsequent bank note; and a comparison device configured to compare the one or initial images to the one or more subsequent images in order to obtain a comparison result.

14 Claims, 9 Drawing Sheets

U.S. PATENT DOCUMENTS

2004/0153408 A1* 8/2004 Jones et al. ............... 705/43

FOREIGN PATENT DOCUMENTS

| DE | 10157959 | 11/2001 |
|---|---|---|
| EP | 0 744 716 B1 | 5/1996 |
| EP | 1113393 | 12/2000 |
| JP | 11-328493 | 5/1998 |
| JP | 2000-322632 | 5/1999 |
| WO | 93/23824 | 11/1993 |
| WO | 00/02111 | 1/2000 |
| WO | WO 01/97180 A2 | 6/2001 |

OTHER PUBLICATIONS

Propekt zem Ruckverfolgungssytem "PIDSY" von Giesecke & Devrient vom, (E3), Mar. 2003, in German.
Procashln/ Signature fur § 36 BbankG, Version 4.0(NT), Produktbeschreibung, Version 3.0, Dec. 2001, in German.
Protokollnotiz zur Prasentation des SN1-Geldeinzahlungsautomaten ProCash PRS am, bei der Kreissparkasse Koln, Neumarkt Aug. 11, 1999, in German.
Anschreiben des Zentralen Kreditausschuss Bundesverband deutscher Banken vom, uber den Versand des Dokuments D3 an die Teilnehmer, Sep. 20, 1999, in German.
European Search Report dated Aug. 6, 2007.
Appeal Brief, Opponent 1, Jul. 29, 2009, 30 pp. (with English translation).
Appeal Brief, Opponent 2, Jul. 30, 2009, 99 pp. (with English translation).
Email Apr. 11, 2003 enclosing PIDSY (E3) document, w. English translation, 2 pages.
Press release, Mar. 20, 2003, w. English translation, 2 pages.
Confirmation of receipt of E6, Sep. 24, 2007, w. abridged English translation, 2 pages.
Reinhard Zeilbeck GmbH invoice for drawing up layout for E3 (PIDSY) Dec. 17, 2002, w. English translation, 1 page.
Color-Offset Gmbh invoice printing E3 (PIDSY) Mar. 19, 2003, w. English translation, 1 page.
Affidavit of Mr. Strasser, w. English translation, 6 pages.
Affidavit Mr. Sterzinger, w. English translation, 5 pages.
ProCashtn/Signature far 36 BbankG; NT and OS/2; Produktbeschreibung, Version 1.0, Jan. 2000, w. English translation, 38 pages.
Image of and content of CD-ROM filed as D7, Feb. 17, 2000, w. English translation, 1 page.
Feb. 9, 2001 Delivery Note to Sparkasse Rhein-Nahe, w. English translation, 3 pages.
Screen printout from SAP System with order No. 257478 contents, Nov. 14, 2009, w. English translation, 1 page.
Screen printout from SAP System Display Bill, Material 8175 . . . , no date, 1 page.
BPV-202 Banknote Reader, BEB, no date, 2 pages.
BEB "Processing Your Money - The Banknote Readers", BEB in dustrie-Elektronik AG, no date, 4 pages.
Affidavit of Mr. Schlaudt, Jun. 11, 2008, w. English translation, 10 pages.
ProCash CRS brochure, Feb. 2000, 4 pages.
Begriffe der Oualitatssicherung and Statistik, DIN 55350, Pt. 13, Jul. 1987, w. English translation, 8 pages.
Bentley, John P., "Principles of Measurement Systems", 3$^{rd}$ Ed., 1995, pp. 14-17.
Demant, Christian et al, "Industrielle Bildverarbeitung", 2$^{nd}$ Ed., w. English translation, 2002, p. 185.
Burger, Wilhelm et al, "Digitale Bildverarbeitung", 2005, w. English translation, pp. 17, 426-428.
BEB "The BPI-200 banknote reader from BEB - note recognition for banknote sorting", no date, 5 pages.
Hans Blaser (BEB) letter to Peter Mueller (BEB) (w. fax cover sheet), Dec. 16, 1991, w. English translation, 7 pages.
BEB-Banknote Line-X, 4 pages.
"Vermarkten nach Noten", Innovation, CASH Nr. 45, Nov. 10, 1995, p. 59, w. English translation, 1 page.
Fax from BEB (Mr. Mueller) to Mr. Egashira, OMRON, Jul. 5, 1996, 4 pages.
FAX from Mr. Egashira to Mr. Mueller of BEB, Jul. 8, 1996, 1 page.
Visitor's Note - Sven Lamme, Varde Planering, Mar. 16, 1996, w. English translation, 1 page.
Mueller Letter to Lamme, Apr. 1, 1996, 1 page.
Visitors' Note - Tanaka & Ishirara, OMRON, Mar. 17, 1997, w. English translation, 1 page.
Mueller letter to Tanaka, Apr. 17, 1997, 1 page.
Visitor's Note - Wieslaw Wilczynski, PPHU Globe, Mar. 13, 1997, 1 page.
Visitor's Note - Sergio Pons Castellanas, Iberselex SA, Mar. 20, 1998, 1 page.
Visitor's Note - Yngve Svensson, Scan Coin, Mar. 22, 2001, 1 page.
Visitor's Note - Matheus Marcondes Neto, Procomp, Mar. 16, 2002, 1 page.
Leibundgut (BEB) letter to Neto (Procomp) Mar. 27, 2002, 1 page.
Visitor's Note - Masaki Yamada, OMRON, Mar. 14, 2003, w. English translation, 1 page.
Visitors' Note - Beal & Lepeintre, Thales Nixdorf, Mar. 13, 2003, 1 page.
Fax from Steinmann (BEB) to Beal & Lepeintre (Thales Nixdorf), Mar. 29, 2003, 1 page.
Rae (CTS) letter to Mueller (BEB) Mar. 17, 1998, 2 pages.
Werner et al, "Taschenbuch der INFORMATIK", May 1995, 2$^{nd}$ Ed., w. English translation, pp. cover page, 1, 154-155.
Encyclopedia Britannica, "opitcal image" definition, 1 page.
Sep. 17, 1999 Delivery Note to Landesbank Berlin AG, w. English translation, 6 pages.
Report Output on procedures to be peformed and materials required for Order No. 1172427, w. English translation, 1 page.
Jan. 10, 2001 Delivery Note to Stadtsparkasse Hanover, w. English translation, 3 pages.
Report Output on procedures to be performed and materials required for Order No. 255796, w. English translation, 1 page.
Report Output on procedures to be performed and materials required for Order No. 257478, w. English translation, 1 page.
Feb. 19, 2001 Delivery Note to Kreissparkasse Pinneberg, w. English translation, 4 pages.
Report Output on procedures to be performed and materials required for Order No. 264507, w. English translation, 1 page.
Mar. 7, 2001 Delivery Note to Volksbank Niirtingen Ge, w. English translation, 3 pages.
Report Output on procedures to be performed and materials required for Order No. 272954, w. English translation, 1 page.
Mar. 9, 2001 Delivery Note to Sparkasse Detmold, w. English translation, 3 pages.
Report Output on proceudres to be performed and materials required for Order No. 273779, w. English translation, 1 page.
Wirtschaft, "Falscher kurbeln das Geschäft an", 12/18/95, w. English translation, 1 page.
Verordnub (EG) (EC Council Reg.) No. 1338/2001, "zur Festlegung von zum Schutz des Euro gegen Geldfälschung erforderlichen Massnahmen", Jun. 28, 2001, w. English translation, 5 pages.
Dr. T. Erny, "EP Document", System and Method for Tracing Bank Notes, Mar. 1, 2010, 26 pp., Appeal No. T1140/09-3403, European Patent No. 1 489 562, Munich, DE.

* cited by examiner

FIG.1

(PRIOR ART)

SYSTEM AND METHOD FOR TRACING BANK NOTES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention generally relates to tracing counterfeit money and, more particularly, to tracing counterfeit money by way of advanced recognition devices.

2. Discussion of Background

Law enforcement agencies often require banks to report a transaction log of a counterfeit bank note that is deposited into an automatic teller machine (ATM) of the bank. A bank note is any form of currency recognized by banks. To comport with law enforcement requirements, banks typically have procedures for tracing bank notes deposited into their ATM machines.

Figure 1:
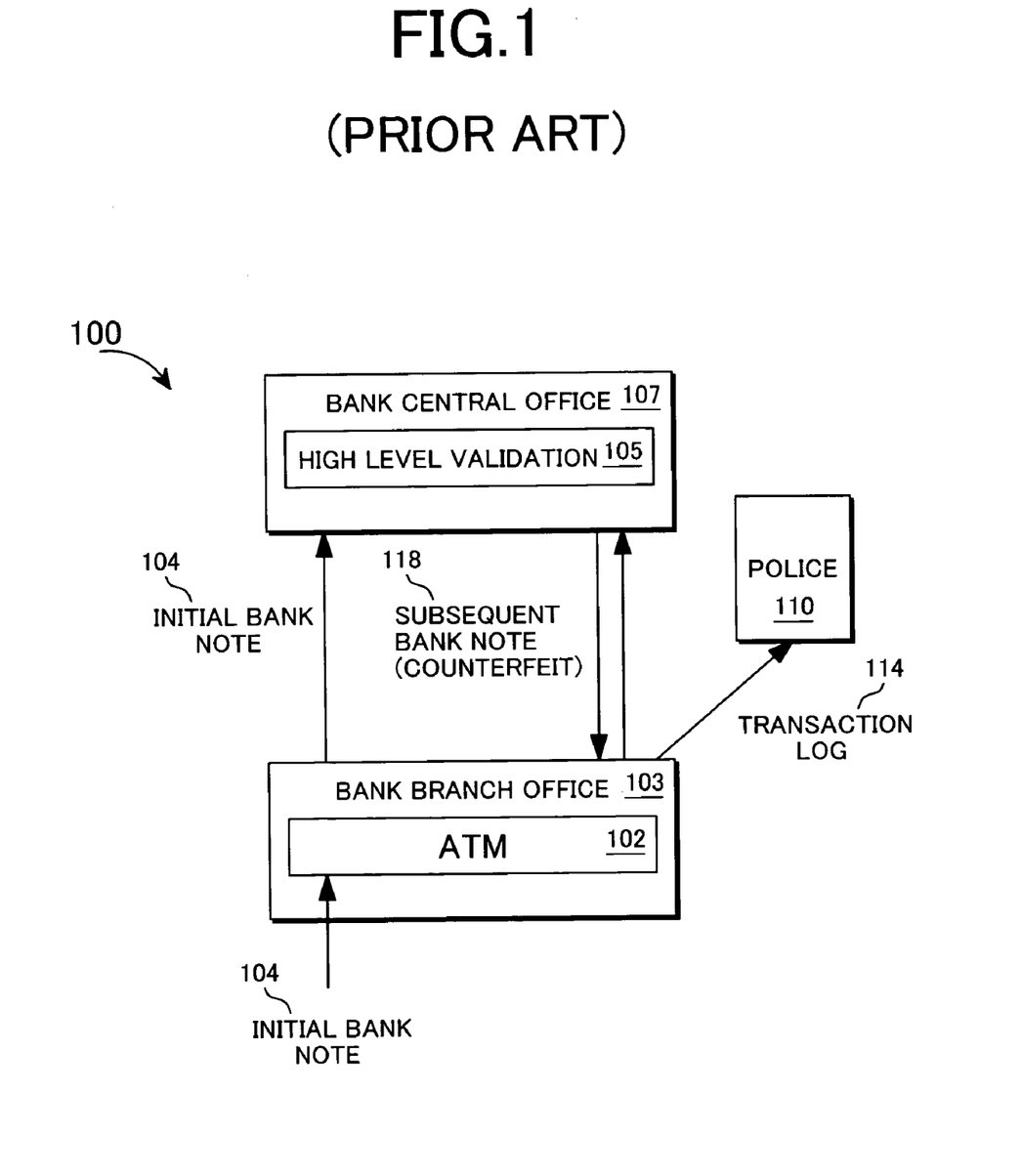
FIG. 1 is a block diagram of a conventional tracing system for informing law enforcement agencies of counterfeit bank notes.

FIG. 1 is a block diagram of a conventional tracing system 100 for informing law enforcement agencies of counterfeit bank notes. An initial bank note 104 is deposited into an ATM 102 of a bank branch office 103. At that point in time, the bank does not know if the initial bank note 104 is counterfeit or not.

The ATM 102 includes a device for recording a transaction log of all deposited bank notes, including the initial bank note 104 of this example. An initial bank note 104 is guided to a bill discrimination unit in the ATM 102 to discriminate the bills denomination. The initial bank note 104 is then led to a written number read unit to read the serial number of the initial bank note 104. The initial bank note 104 is stored in a cartridge of the ATM 102 with other deposited bank notes. The serial number of the initial bank note 104 is stored in a cartridge memory of the ATM 102.

The cartridge is taken out of the ATM 102 and transferred to the bank central office 107. At the bank central office 107, high-level validation 105 is performed on the initial bank note 104. If the initial bank note 104 is found to be a counterfeit bill, the initial bank note undergoes subsequent procedures as a subsequent bank note 118. Note that the subsequent bank note 118 is physically the same bank note as the initial bank note 104, but is referred to here as the subsequent bank note 118 to indicate subsequent procedures are performed.

The subsequent bank note 118 is taken back to the bank branch office 103. The serial number of the subsequent bank note 103 is read out of the cartridge memory to trace the past passing route of the bank note. A transaction log 114 is obtained from the bank branch office 103. A typical transaction log 114 includes the date the bank note was initially deposited, a customer identification, and the total amount of the deposit. The transaction log 114 is then reported to the police 110 and the bank central office 107.

Unfortunately, conventional tracing systems 100 lack comprehensive, fail-safe procedures for identifying and tracing counterfeit bank notes. For example, one recording device in a conventional tracing system 100 uses merely the serial number of the bank note to keep track of the bank note deposited into the ATM 102. See, for example, Jap. Pat. publication No. 11-328493, "Device And System For Paper Sheet Data Management." Another recording device uses the serial number in combination with the customer fingerprint image to keep track of the bank note and the corresponding customer. See, for example, Jap. Pat. publication No. 2000-322632, "Handling Device For Coins Or The Like."

Problems are associated with using merely the serial number to identify a bank note. One problem with using the serial number is that a counterfeit note will oftentimes have the same serial number as a genuine bank note. Consequently, the conventional tracing system 100 cannot distinguish between a genuine bank note and a counterfeit bank note having the same serial number. Another problem with using the serial number to identify a bank note is that a counterfeit note may have the same serial number as another counterfeit bank note. Consequently, the conventional tracing system 100 cannot distinguish between multiple counterfeit bank notes having the same serial number. Thus, conventional tracing systems 100 lack the minimal precision that is required to accurately trace counterfeit bank notes and to catch savvy criminals.

Other problems are associated with the device that captures an image of the serial number. Conventional imaging devices are not sufficiently accurate to capture reliably an image of a bank note's serial number. Further, conventional imaging devices are not sufficiently accurate to capture reliably an image of a bank note's other parts as well.

SUMMARY OF THE INVENTION

It has been recognized that what is needed is a tracing system that can trace bank notes at a higher level of accuracy. Broadly speaking, the present invention fills these needs by providing a system and method of tracing bank notes by way of advanced recognition devices. It should be appreciated that the present invention can be implemented in numerous ways, including as a process, an apparatus, a system, a device or a method. Several inventive embodiments of the present invention are described below.

In one embodiment, an automatic teller machine (ATM) electronically connected to one or more devices is provided. The one or more devices comprise a deposit device configured to receive an initial bank note; an image extraction device configured to extract one or more initial images from the initial bank note; a transaction log device configured to attach a transaction log to the one or more initial images, wherein the deposit device is further configured to receive a subsequent bank note, wherein the image extraction device is further configured to extract one or more subsequent images from the subsequent bank note; and a comparison device configured to compare the one or initial images to the one or more subsequent images in order to obtain a comparison result.

In another embodiment, an interface to an automatic teller machine (ATM) of a bank is provided. The interface has one or more screens configured to be displayed on a display of the automatic teller machine. The one or more screens comprise a tracing mode, wherein use of the tracing mode requires special authorization by the bank; a kind option of the tracing mode, wherein the kind option is configured to be selected and to initiate instructions to display a request to input a subsequent bank note of a particular kind; a start search option of the tracing mode, wherein the start search option is configured to be selected and to initiate instructions to begin a comparison between subsequent images of the subsequent bank note and initial images of an initial bank note; and a comparison results screen of the tracing mode, wherein the comparison results screen is configured to display comparison results upon completion of the comparison.

In still another embodiment, a method of tracing bank notes is provided. The method comprises receiving a deposit of an initial bank note; extracting one or more initial images from the initial bank note; attaching an initial transaction log to the one or more initial images; receiving a deposit of a subsequent bank note; extracting one or more subsequent images from the subsequent bank note; and comparing the one or more initial images to the one or more subsequent images in order to obtain a comparison result.

Advantageously, the tracing system of the present identifies bank notes by using more than a mere serial number. Accordingly, the tracing system can distinguish between two different bank notes having the same serial number. The tracing system of the present invention traces bank notes at a high level of accuracy, and can therefore be relied upon during the pursuit of savvy criminals.

The invention encompasses other embodiments of a system, a method, an apparatus, and a computer-readable medium, which are configured as set forth above and with other features and alternatives.

BRIEF DESCRIPTION OF THE DRAWINGS

The present invention will be readily understood by the following detailed description in conjunction with the accompanying drawings. To facilitate this description, like reference numerals designate like structural elements.

DESCRIPTION OF THE PREFERRED EMBODIMENTS

An invention for a system and method of tracing bank notes is disclosed. Numerous specific details are set forth in order to provide a thorough understanding of the present invention. It will be understood, however, to one skilled in the art, that the present invention may be practiced without some or all of these specific details.

General Overview

Figure 2:
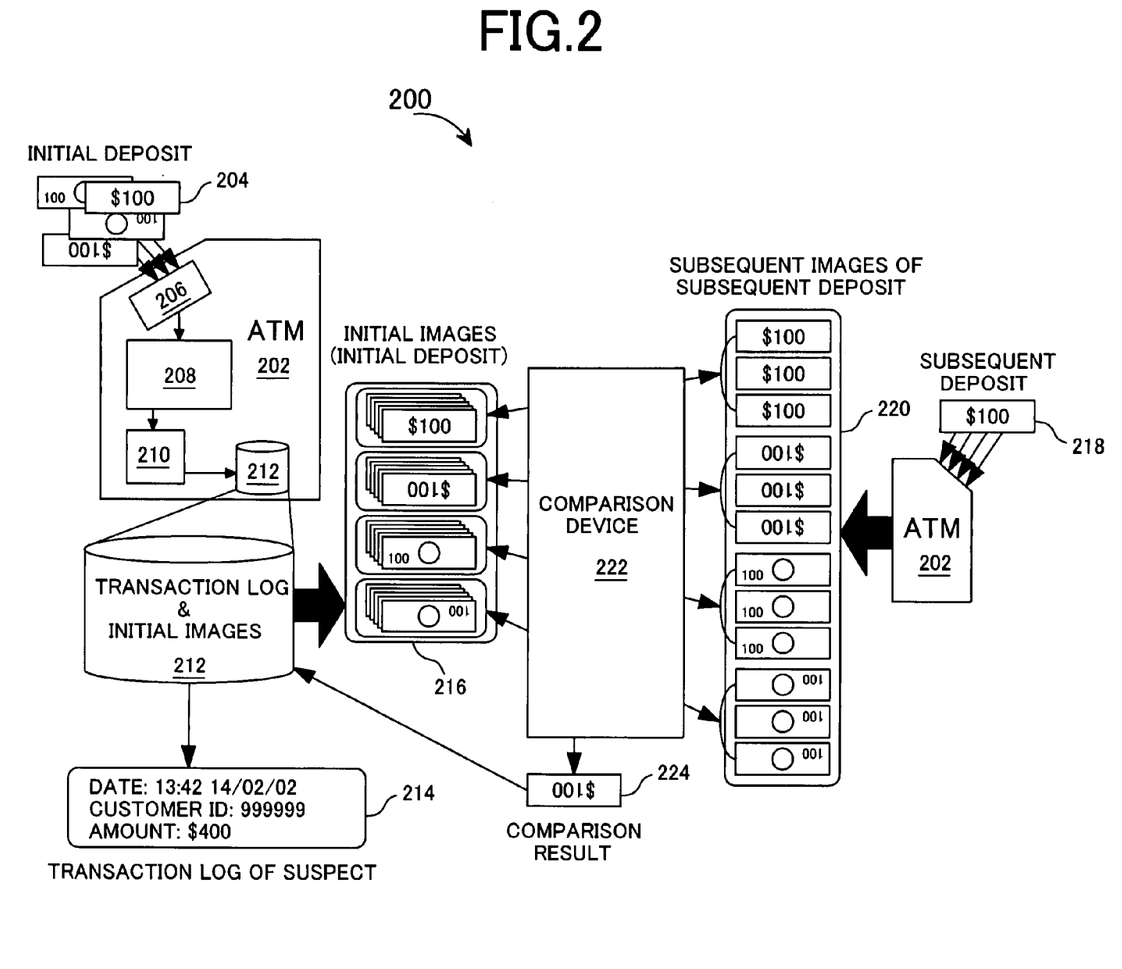
FIG. 2 is a schematic diagram of a tracing system for tracing bank notes, in accordance with an embodiment of the present invention.

FIG. 2 is a schematic diagram of a tracing system 200 for tracing bank notes, in accordance with an embodiment of the present invention. An initial bank note 204 is deposited into a deposit device 206 configured to receive the initial bank note 204. The deposit device 206 is located at the front of the automatic teller machine (ATM) 202 of the bank branch office (not shown), and is easily accessible by a customer or other user. The ATM 202 is also configured to receive multiple different bank notes. However, a single initial bank note 204 is discussed here for explanatory purposes.

The initial bank note is transferred to an image extraction device 208. In this embodiment, the image extraction device 208 is shown to be a part of the ATM 202. However, the present invention is not so limited. Alternatively, the image extraction device 208 may be located externally to the ATM 202.

The image extraction device 208 is configured to extract one or more initial images 216 from the initial bank note 204. The image extraction device 208 includes an analog-to-digital (A/D) converter to convert an analog image of the bank note into a corresponding digital image that can be processed as desired.

An important purpose of the image extraction device 108 is to extract a sufficient number of initial images 216 to capture unique characteristics of a bank note in order to uniquely identify the bank note. An extracted initial image 216 is preferably a combination of some of these unique characteristics of the bank note. An extracted initial image 216 captures at least a portion of the front or back side of the initial bank note 204. The image extraction device 208 preferably uses photographic techniques to sense characteristics such as color, brightness, hue, intensity, unique markings, blood stains, ink stains, pencil marks, discoloration, abnormal coloring, damage areas, creases, holes, tears, etc. Other image capturing techniques may also be used to sense such characteristics. For example, other image capturing techniques may involve use of infrared rays, ultraviolet rays, X-rays, photoluminescence, chemiluminescence, fluorescence, magnetic resonance imaging (MRI), chemicals, etc. Thus, an extracted image may be one of a photographic image, an infrared image, an ultraviolet ray image, an x-ray image, a photoluminescent image, a chemiluminescent image, a fluorescent image, a magnetic resonance image, a chemical image, or other type of image.

The initial images 216 may include different images of the initial bank note 204, where each different image captures unique characteristics of the initial bank note 204 while positioned in a different position. These different images include a front side image and a backside image. The position of the front side image and the position of the backside image depend on the direction the initial bank note is deposited.

Alternatively, the initial images 216 may include, for example, an image of four different positions of the initial bank note 204. Further, the initial images may be divided into groups of initial images in which each group of initial images includes image of the initial bank note in one particular position. A first position may be a front side forward position. A second position may be a front side backward position. A third position may be a back side forward position. A fourth position may be a back side backward position. An important of purpose of extracting images from multiple different positions is to increase the precision of the tracing system 200, and to thereby increase overall accuracy for tracing bank notes.

The initial images are transferred to a transaction log device 210 configured to attach a transaction log 214 to the initial images 216. The transaction log includes the date and time of the initial deposit, the customer identification, the amount of the deposit, the image of the customer, and any other useful information. The transaction log 214 and the corresponding initial images 216 are then stored in a storage device 212 of the of the ATM 202. This embodiment shows the storage device 212 as being a part of the ATM 202. However, the present invention is not so limited.

Alternatively, the storage device 212 may be located externally to the ATM 202, wherein a network link in the ATM 202 is electronically connected to the external storage device (not shown). Using a network link to the external storage device, a copy of the initial images 216 is sent to the external storage device. The external storage device is configured to store any image, including initial images and subsequent images.

The Initial ATM 202 used for the initial deposit 204 is preferably the same ATM 202, with the same image extraction device 208, used for subsequent procedures. One advantage of using the same ATM 202 is that the same ATM 202 is likely going to interact with the subsequent bank note 218 in substantially the same way the ATM 202 interacted with the initial bank note 204. Such a duplication in the behavior of the ATM 202 will likely provide better accuracy during subsequent procedures, specifically, more accurate calculating of comparison results 224. These subsequent procedures are discussed below. Alternatively, the initial ATM 202 used for the initial deposit 204 by the customer of the initial bank note 204 is not the same ATM used for subsequent procedures. Using a different ATM may, for example, be more convenient for the bank performing the subsequent procedures.

The initial bank note 204 is transported to the bank central office (not shown) for further processing. At the bank central office, high-level validation is performed on the initial bank note 204. If the initial bank note 204 is found to be a counterfeit bill, the initial bank note 204 undergoes subsequent procedures as a subsequent bank note 218. Note that the subsequent bank note 218 is physically the same bank note as the initial bank note 204, but is referred to here as the subsequent bank note 218 to indicate subsequent procedures are performed.

The subsequent bank note 218 is transported back to the ATM 202 of the bank branch office (not shown). This embodiment shows the subsequent note being deposited into the same ATM 202. However, the present invention is not so limited. For example, these subsequent procedures may be performed at any chosen ATM of the particular bank. The chosen ATM may be connected to an image extraction device and to a network link (not shown) to the storage device 212.

Authorized personnel 620 deposits the subsequent note 218 into the ATM 202 using the deposit device 206. The subsequent bank note 218 is then transferred to the image extraction device 208. The image extraction device 208 is further configured to extract one or more subsequent images 220 from the subsequent bank note 218. The subsequent images 220 are extracted in an effort to associate the subsequent images 220 to corresponding initial images 216, and to thereby trace the initial bank note 204. Accordingly, another important purpose of the images extraction device 108 is to extract a sufficient number of subsequent images 220 to be able to associate the subsequent images 220 to initial images 216. An extracted subsequent image captures at least a portion of the front or back side of the subsequent bank note 218.

The subsequent images 220 may include different images of the subsequent bank note 218, where each different image captures unique characteristics of the subsequent bank note 218 while positioned in a different position. For example, the subsequent images 220 may include an image of four different positions of the initial bank note 204. A first position may be a front side forward position. A second position may be a front side backward position. A third position may be a back side forward position. A fourth position may be a back side backward position. The image extraction device is further configured to extract multiple different images of each position of the subsequent bank note 218, as shown in FIG. 2.

The ATM 202 includes, or is connected to, a comparison device 222 configured to compare the initial images 216 to the subsequent images 220. A comparison result 224 is obtained from the comparison operations. If the comparison result 224 indicates a match, the transaction log attached to the corresponding initial bank note 204 is retrieved.

More Details Of The Tracing System

Figure 3:
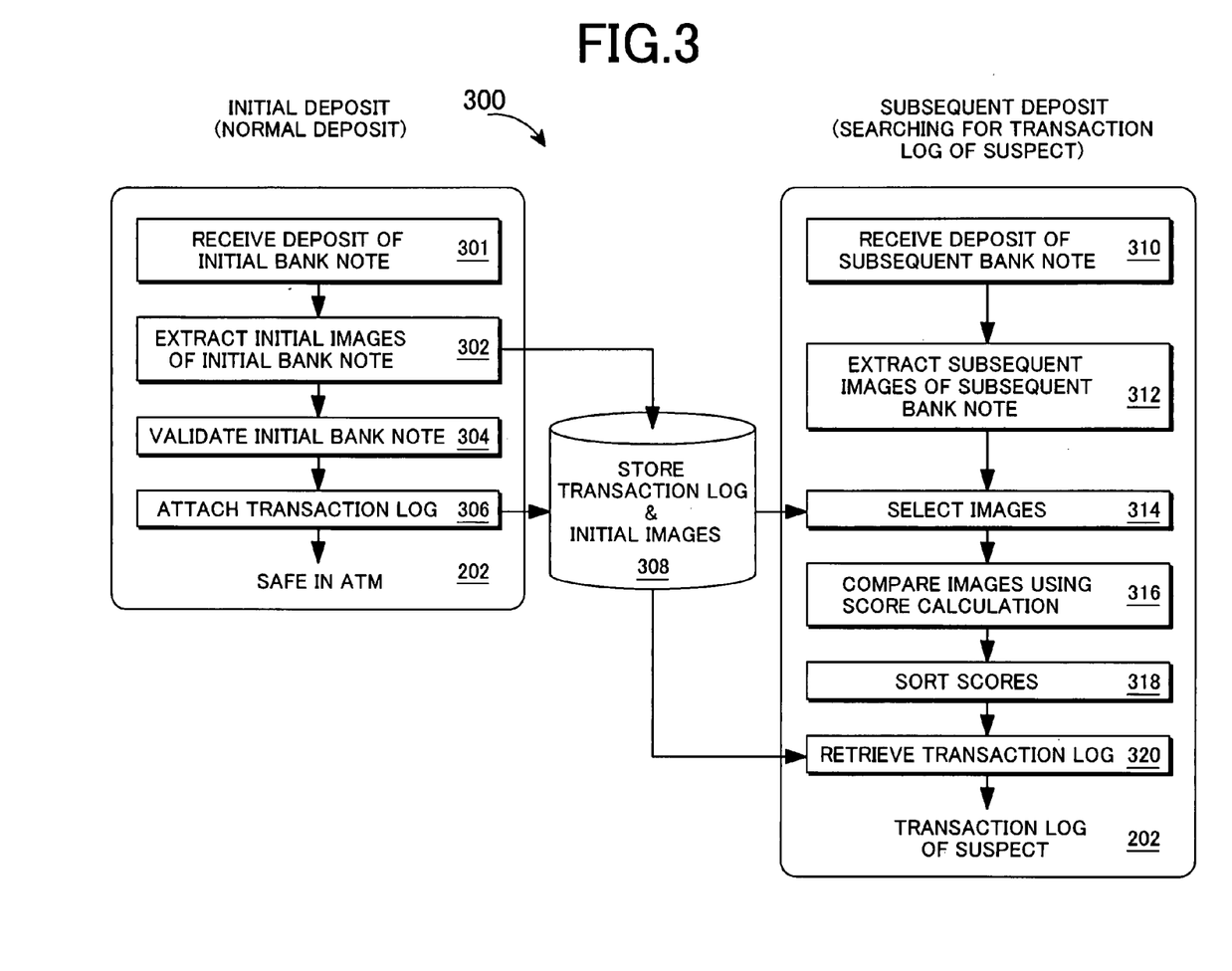
FIG. 3 is flowchart of a tracing method for tracing bank notes, in accordance with an embodiment of the present invention.

FIG. 3 is flowchart of a tracing method 300 for tracing bank notes, in accordance with an embodiment of the present invention. This flowchart may correspond to specific devices discussed above with reference to FIG. 2. However, the tracing method 300 is not limited to these specific devices, and other suitable devices may be interchanged.

An initial bank note 204 is received in step 301. Step 302 involves extracting initial images 216 from the initial bank note 204. In step 304, a preliminary validation is performed on the initial bank note 204 to determine if the initial bank note is genuine. This preliminary validation involves determining the bank note type, for example, $1, $5, $20, or $100. The preliminary validation also involves performing an initial counterfeit screening of the initial bank note 204. This initial screening is not as robust as a more comprehensive screening that is subsequently performed at the central bank office. Further, the preliminary validation involves determining the direction or position in which the bank note is received into the ATM 202.

A transaction log 214 is then attached to the extracted initial images 216 in step 306. In step 308, the transaction log 214 and the initial images 216 are stored in the storage device 212.

At a later point in time, it may desirable to find the transaction log of the initial bank note 204 because the initial bank note 204 is found to be counterfeit. Accordingly, a subsequent bank note 218 is received by the ATM in step 310. In step 312, subsequent images 220 are extracted from the subsequent bank note 218. Initial images are then selected from the storage device 212, as well as from the group of subsequent images, in step 314. These selected images are compared using a score calculation operation in 316. For example, initial images corresponding to a particular initial bank note receive a particular score. Other initial images corresponding to another particular initial bank note receive another particular score, and so on. All of the scores are then sorted in order of degree of similarity in step 318, wherein the highest score indicates the highest degree of similarity. The transaction log 214 associated with the highest score is then retrieved in step 320.

Figure 4:
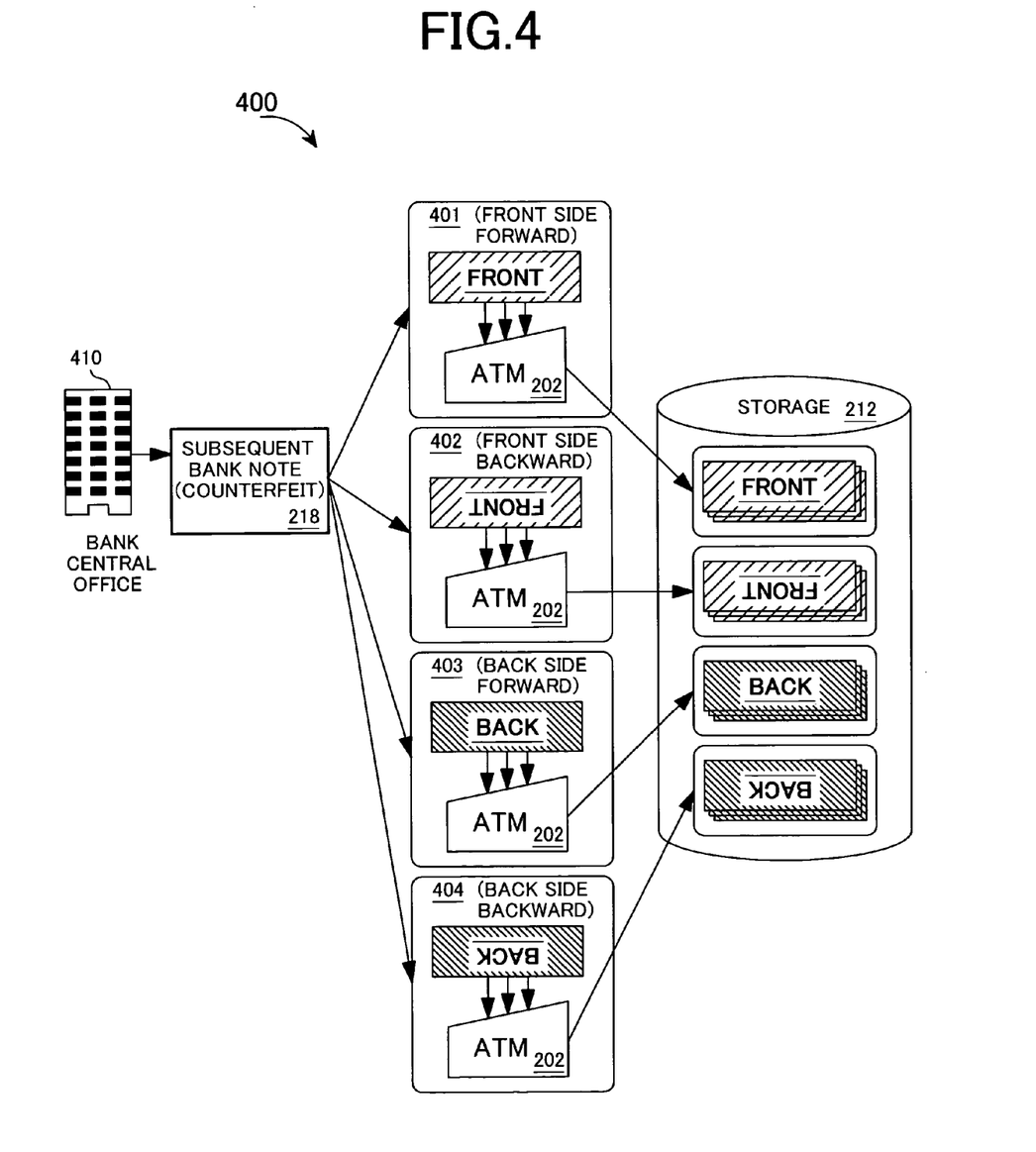
FIG. 4 is a schematic diagram of operations of the image extraction device, in accordance with an embodiment of the present invention.

FIG. 4 is a schematic diagram of operations of the image extraction device 208, in accordance with an embodiment of the present invention. This example shows image extraction operations on a subsequent bank note 218 for explanatory purposes. These operations generally may be applied extracting images from an initial bank note 204 as well. FIG. 4 shows image extraction of various specific positions of the subsequent bank 218. However, the present invention is not so limited to these specific positions, and other suitable positions may be used.

Improved matching results are achieved when comparisons of all directions of the bank notes, including the initial bank note 204 and the subsequent bank note 218, are performed. These directions include all positions in which an initial bank note can be received into the ATM 202. Further, improved comparison speed can be achieved when a group of subsequent images is compared with an initial image in a same position. In other words, if an initial image is of a particular position, time can be saved by not comparing subsequent images of another particular position.

In step 401, the subsequent bank note 218 is deposited into the ATM 202 in a front side forward position. The front side forward position is preferably deposited several different times by authorized personnel 620 into the ATM 202. For each different deposit, a different subsequent image is subtracted from the subsequent bank note 218. These different subsequent images are stored in the storage device 212.

In step 402, the subsequent bank note 218 is deposited into the ATM 202 in a front side backward position. The front side backward position is preferably deposited several different times by authorized personnel 620 into the ATM 202. For each different deposit, a different subsequent image is subtracted from the subsequent bank note 218. These different subsequent images are stored in the storage device 212.

In step 403, the subsequent bank note 218 is deposited into the ATM 202 in a back side forward position. The back side forward position is preferably deposited several different times by authorized personnel 620 into the ATM 202. For each different deposit, a different subsequent image is subtracted from the subsequent bank note 218. These different subsequent images are stored in the storage device 212.

Alternatively, the ATM 202 may be configured such that the subsequent image 218 has to inputted only once. Devices of the ATM 202 may be configured to change positioning of the subsequent image 218 automatically.

In step 404, the subsequent bank note 218 is deposited into the ATM 202 in a back side backward position. The back side backward position is preferably deposited several different times by authorized personnel 620 into the ATM 202. For each different deposit, a different subsequent image is subtracted from the subsequent bank note 218. These different subsequent images are stored in the storage device 212.

Figure 5:
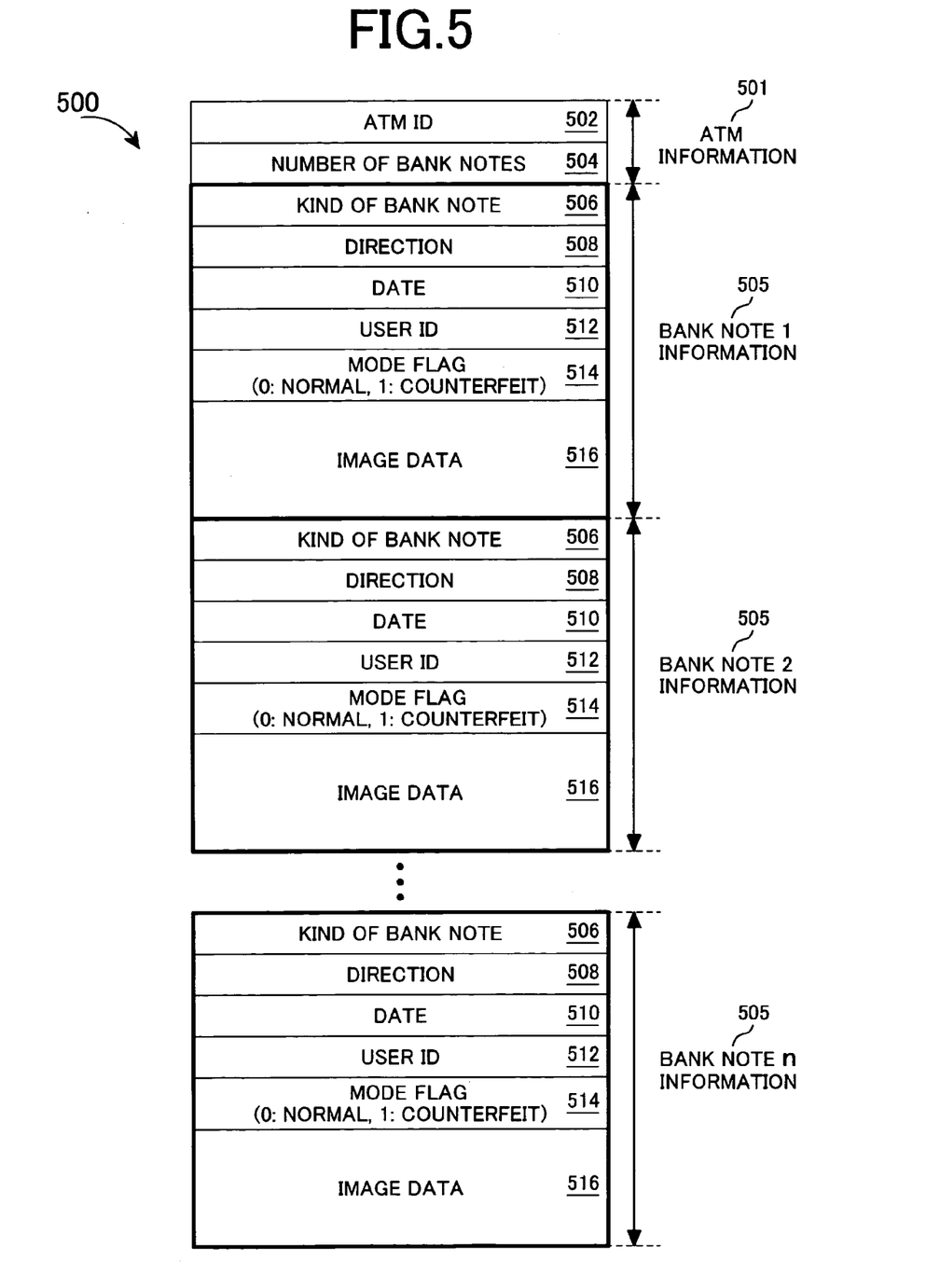
FIG. 5 shows a data structure of transaction information and image data, in accordance with an embodiment of the present invention.

FIG. 5 shows a data structure 500 of transaction information and image data, in accordance with an embodiment of the present invention. The data structure 500 may be a linked list of data as shown in FIG. 5. The data structure 500 includes ATM information 501 and bank note information 505. Alternatively, the data structure 500 may be a collection of separate structures, wherein each bank note information 505 is separate and correlates to the ATM information 501. The ATM information 501 includes ATM specific information, such as ATM identification 502 and number of bank notes 504 that have been deposited and recorded in the ATM 202. The bank note information 505 includes bank note specific information, such as bank note kind 506, bank note direction 508, deposit date 510, user identification 512, mode flag 514 to indicate a normal or counterfeit note, and image data 516 which may include initial images 216 or subsequent images 220.

Figure 6:
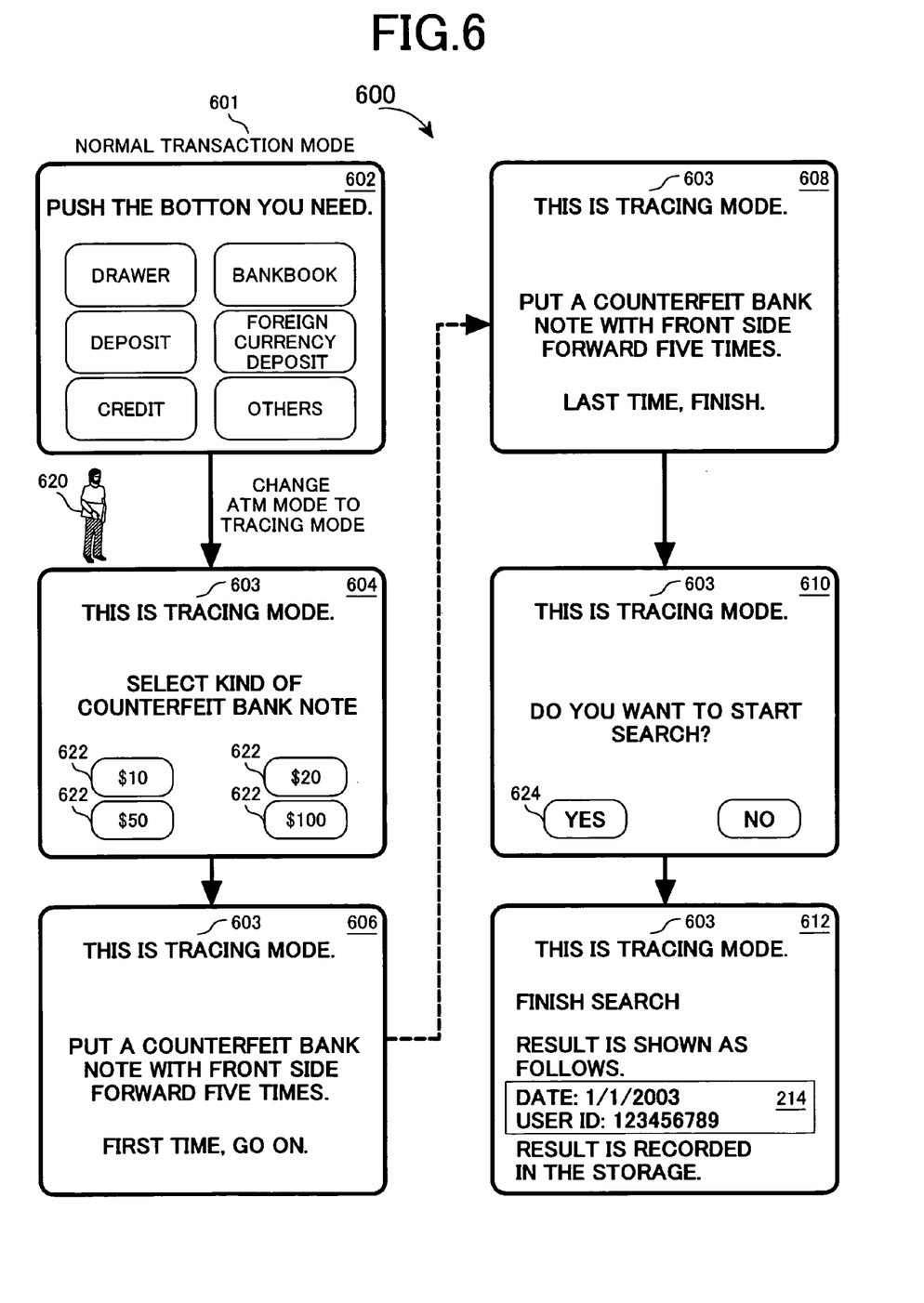
FIG. 6 shows an example interface for the ATM, in accordance with an embodiment of the present invention.

FIG. 6 shows an example interface 600 for the ATM 202, in accordance with an embodiment of the present invention. The interface 600 includes one or more screens configured to be displayed on a display of the ATM 202. The one or more screens include a normal transaction mode 601 and a tracing mode 603. In a normal transaction mode 601, the ATM 202 is configured to display normal mode screens 602 and to perform normal transactions with a bank customer. A normal screen 602 provides a part of the interface 600 that allows the bank customer to make normal transactions, such as deposits of initial bank notes 204, withdrawals, foreign currency deposits, credit inquiries, etc.

On the other hand, access to the tracing mode 603 requires special authorization by the bank that has rights to the ATM 202. The ATM 202 may be configured, for example, to require inputting of an authorization code in order to access tracing mode 503. Tracing mode 603 may be accessed when authorized personnel 620 needs to deposit a subsequent bank note 218 into the ATM 202. In other words, when the initial bank note 204 is determined by the bank central office 410 to be counterfeit, that bank note is transported back to the ATM 202 as a subsequent bank note 218 in order to retrieve the transaction log 214.

In tracing mode 603, the ATM 202 is configured to display tracing mode screens 604, 606, 608, 610, and 612, and to perform tracing operations. Tracing mode screens provide parts of the interface 600 that allow the authorized personnel 620 to perform procedures for retrieving the transaction log 214. FIG. 6 shows five tracing mode screens 604, 606, 608, 610, and 612 for explanatory purposes. However, the present invention is not so limited. Additional or fewer tracing mode screens may be provided, depending on the specific design of the particular interface 600.

A kind option screen 604 includes kind options 622 for selecting the particular kind of denomination of the subsequent bank note 218. FIG. 6 shows kind options 622 for $10, $20, $50, and $100. The kind option 622 is configured to be selected and to initiate instructions to display a request deposit screen 606. A kind option 622 is electronically connected to a touch-sensitive portion of the display 904. Alternatively, a kind option 622 could be electronically connected to a mechanical button (not shown) of the ATM 202.

The request deposit screen 606 displays a request to input a subsequent bank note 218 (counterfeit bank note). FIG. 6 shows the request deposit screen 606 asking for a counterfeit bank note with front side forward five times. The authorized personnel may then input the subsequent bank note 218 (counterfeit bank note). The dotted line in FIG. 6 indicates that several more request deposit screens may be included, each asking for the same counterfeit bank note in a certain direction. The discussion with reference to FIG. 4 explains a procedure for extracting a subsequent image 220 from the subsequent bank note 218. Request deposit screen 608 displays an indication that the depositing procedure is finished.

The interface 600 is configured to then display a start search screen 610. The start search screen 610 includes a start search option 624 configured to be selected and to initiate instructions to begin a comparison between subsequent images 220 and initial images 216. In FIG. 6, the start search option 624 is a "Yes" button, which is electronically connected to a touch-sensitive portion of the display 904. Alternatively, the start search option 624 may be electronically connected to a mechanical button (not shown) of the ATM 202.

After the comparison operations are complete, the interface 600 is configured to display a comparison results screen 612. The comparison results screen 612 is configured to display comparison results of the comparison between subsequent images 220 and initial images 216. FIG. 6 shows the comparison results screen 612 as displaying the transaction log 214.

Figure 7:
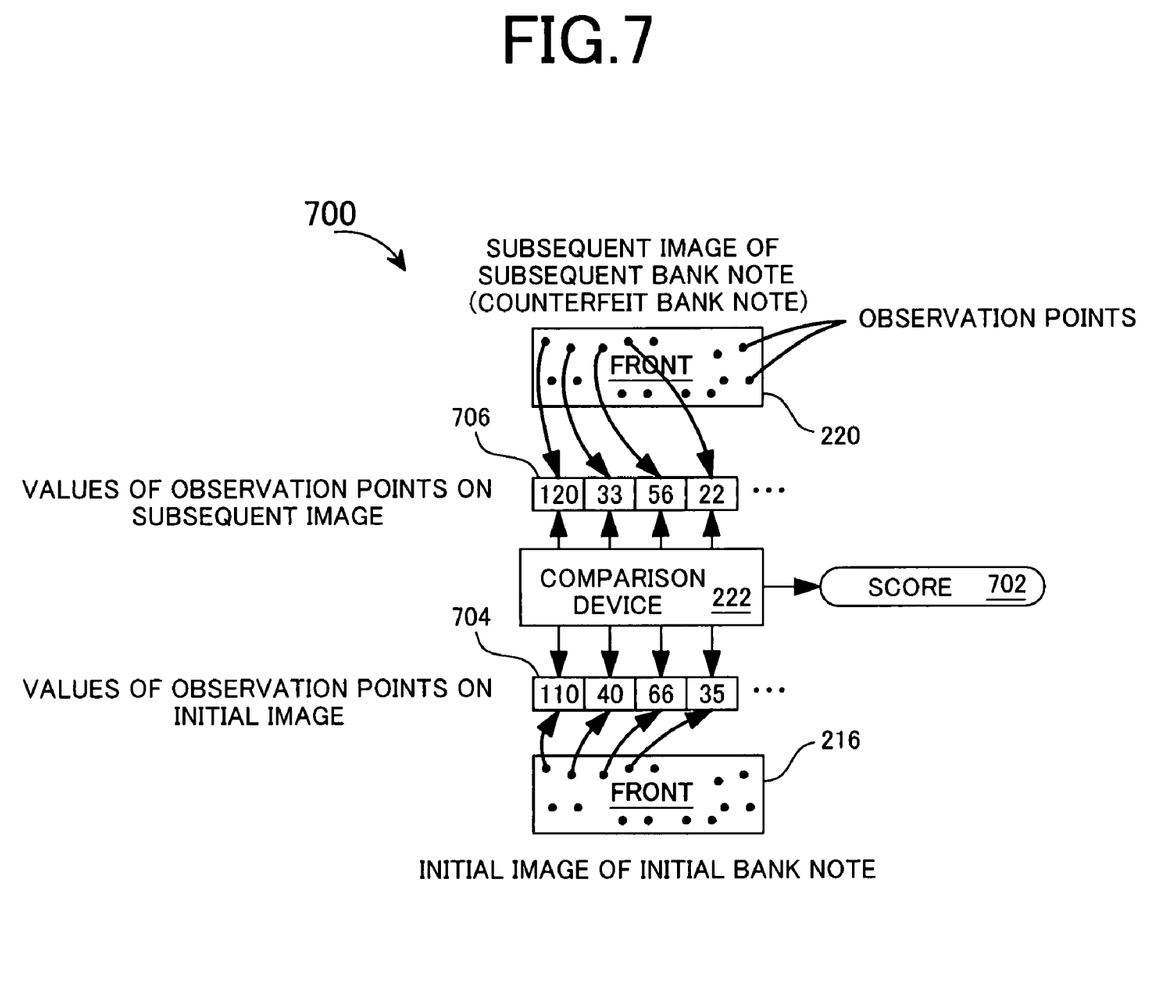
FIG. 7 is a schematic diagram of a comparison operation performed by the comparison device, in accordance with an embodiment of the present invention.

FIG. 7 is a schematic diagram of a comparison operation 700 performed by the comparison device 222, in accordance with an embodiment of the present invention. FIG. 7 shows a comparison operation 700 between one subsequent image 220 and one initial image 216. The images are digital data converted from analog images of bank notes. In this example, the images include observation points. The observation points of the subsequent image 220 have observation point values 706. Likewise, the observation points of the initial image 216 have observation point values 704. The observation point values are combined to describe image characteristics, such as color, brightness, hue, intensity, unique markings, blood stains, ink stains, pencil marks, discoloration, abnormal coloring, damage areas, creases, holes, tears, etc. Image capturing techniques used to obtain the observation point values may involve use of infrared rays, ultraviolet rays, X-rays, photoluminescence, chemiluminescence, fluorescence, magnetic resonance imaging (MRI), chemicals, etc.

The observation point values 706 of the subsequent image 220 are compared with corresponding observation point values 704 of the initial image 216. One calculation technique for comparing the images involves use of a Euclid distance formula. For example, the Euclid distance between the images of FIG. 7 would be Equation 1 below.

$$\text{Euclid Distance} = \sqrt{(120-110)^2 + (33-40)^2 + (56-66)^2 + (22-35)^2 \cdots}$$

Equation 1

Euclid Distance Between Images Of FIG. 7.

A relatively high Euclid distance would indicate a low likelihood that the subsequent bank note 218 is the same as the initial bank note 204. A relatively low Euclid distance would indicate a high likelihood that the subsequent bank note 218 is the same as the initial bank note 204. Using such a technique, a range of similarity could be predetermined such that a certain Euclid distance falling within the range of similarity would be accepted as a match. Note that a Euclid distance formula is only one technique for comparing image data, and other suitable techniques may be used.

Figure 8:
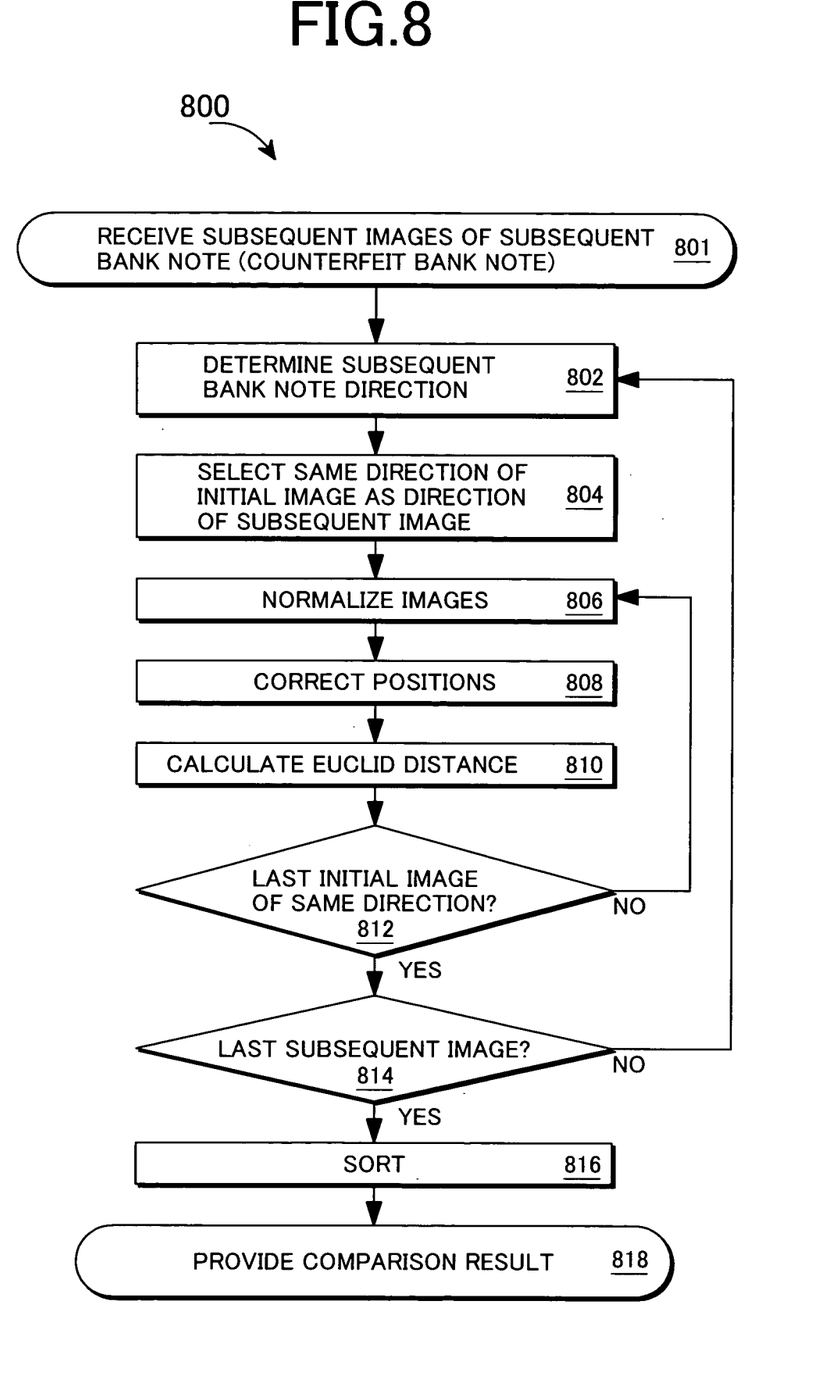
FIG. 8 is a flowchart of an overall comparison process, in accordance with an embodiment of the present invention.

FIG. 8 is a flowchart of an overall comparison process 800 using a Euclid distance calculation, in accordance with an embodiment of the present invention. The comparison process is carried out by at least the tracing system 200, including the comparison device 222 and other system devices 900.

In step 801 the subsequent images 220 are received. The tracing system 200 then determines the direction (or position) of the subsequent bank note 218. Next, an initial image 216 from an initial bank note 204 must be selected. Accordingly, in step 804, the same direction of the initial image is selected to match the direction of the deposited subsequent bank note 218. Next, the images are normalized in step 806 in order to fix a relative minimum and a relative maximum between the images. In step 808, the positions are then corrected. Position correction involves making sure adjusting the digital format of the images to ensure the position of the subsequent image 220 is substantially the same as the position of the initial image 216.

A Euclid distance between the images is then calculate in step 810. An example of a Euclid distance calculation is discussed above with reference to FIG. 7. Decision operation 812 involves determining whether the compared initial image is the last initial image 216 of the same direction. If not, the comparison process 800 returns to step 806, where another initial image of the same is normalized with the subsequent image 220. However, if the compared initial image is the last initial image 216, the decision operation 814 determines whether the compared subsequent image is the last subsequent image 220 to be compared. If not, the comparison process returns to step 802. If so, in step 816, all of the Euclid distances from all comparisons are sorted in order of likelihood of a match. The comparison result is then provided in step 818. Note that the comparison result does not necessarily have to indicate a match. The comparison result may indicate an initial bank note 204 having the highest likelihood of a match.

System and Method Implementation

Portions of the present invention may be conveniently implemented using a conventional general purpose or a specialized digital computer or microprocessor programmed according to the teachings of the present disclosure, as will be apparent to those skilled in the computer art.

Figure 9:
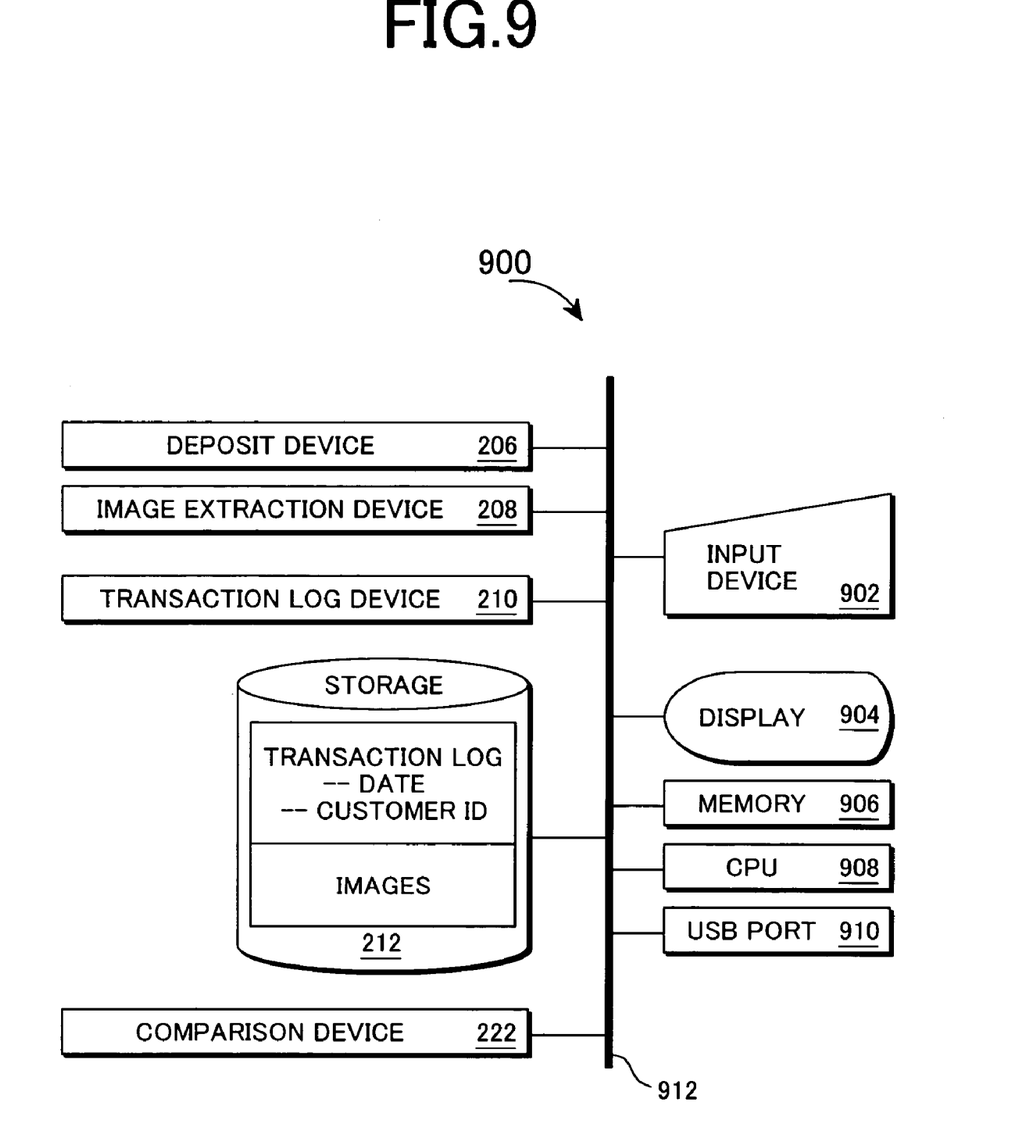
FIG. 9 is a block diagram of devices of the tracing system, in accordance with an embodiment of the present invention.

FIG. 9 is a block diagram of devices 900 of the tracing system 200, in accordance with an embodiment of the present invention. The devices 900 are electronically connected by a bus 912. The tracing system 200 includes a deposit device 206, an image extraction device 208, a transaction log device 210, a storage device 212, a comparison device 222. The tracing system 200 also includes an input device 902, a display device 904, a memory 908, a CPU 908, and a USB port 910. These devices 900 are made up of hardware, software, or a combination of hardware and software.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical disks, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, extracting one or more initial images from the initial bank note attaching an initial transaction log to the one or more initial images, receiving a deposit of a subsequent bank note, extracting one or more subsequent images from the subsequent bank note, and comparing the one or more initial images to the one or more subsequent images in order to obtain a comparison result, according to processes of the present invention.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An automatic teller machine (ATM) electronically connected to one or more devices, the one or more devices comprising:
   a deposit device configured to receive a plurality of bank notes;
   an image extraction device configured to extract one or more initial images of the plurality of bank notes;
   the image extraction device also being configured to receive a counterfeit bank note, which has been identified as being counterfeit at an external station, and extract one or more subsequent images of the counterfeit bank note;
   a transaction log device configured to attach a transaction log to the one or more initial images of the plurality of bank notes;
   a comparison device configured to compare the one or more initial images of the plurality of bank notes to the one or more subsequent images of the counterfeit bank note in order to obtain a comparison result, the comparison device being configured to calculate values indicating a degree of similarity between the plurality of bank notes and the counterfeit bank note as said comparison result; and
   a retrieval device which is configured to retrieve the transaction log attached to one of the plurality of bank notes, if the comparison device determines that the one or more initial images of said one of the plurality of bank notes are within a range of similarity to the one or more subsequent images of the counterfeit bank note.

2. The automatic teller machine of claim 1, the one or more devices further comprising at least one of:
   a storage device configured to store the one or more initial images of the plurality of bank notes, the one or more subsequent images of the counterfeit bank note and the transaction log; and
   a network link to an external storage device configured to store the one or more initial images of the plurality of bank notes, the one or more subsequent images of the counterfeit bank note and the transaction log.

3. An automatic teller machine (ATM) electronically connected to one or more devices according to claim 1, wherein the image extraction device is further configured to:
   extract a front side initial image in a first initial position;
   extract a front side initial image in a second initial position;
   extract a back side initial image in a first initial position; and
   extract a back side initial image in a second initial position.

4. The automatic teller machine of claim 3, wherein the image extraction device is further configured to:
   extract a front side subsequent image in a first subsequent position;
   extract a front side subsequent image in a second subsequent position;
   extract a back side subsequent image note in a first subsequent position; and
   extract a back side subsequent image in a second subsequent position.

5. The automatic teller machine of claim 4, wherein the comparison device is further configured to compare each subsequent image in each subsequent position a plurality of times to a corresponding initial image.

6. The automatic teller machine of claim 1, wherein the comparison device is further configured to analyze image characteristics using a Euclid distance formula, and further configured to determine whether the one or more initial images and the one or more subsequent images have a Euclid distance near zero, wherein the range of similarity includes having a Euclid distance near zero.

7. A method of tracing bank notes, comprising the steps of:
   receiving deposits of a plurality of bank notes;
   extracting one or more initial images from the plurality of bank notes;
   attaching an initial transaction log to the one or more initial images of the plurality of bank notes;
   receiving a deposit of a counterfeit bank note, which has been identified as a counterfeit bank note;
   extracting one or more subsequent images from the counterfeit bank note;
   comparing the one or more initial images of the plurality of bank notes to the one or more subsequent images of the counterfeit bank note by calculating values indicating a degree of similarity between the plurality of bank notes and the counterfeit bank note in order to obtain a comparison result; and
   retrieving the initial transaction log based on the comparison result, if the comparison result indicates that the one or more initial images of one of the plurality of bank notes are within a range of similarity to the one or more subsequent images of the counterfeit bank note,
   wherein the steps of extracting one or more initial images from the plurality of bank notes and extracting one or more subsequent images from the counterfeit bank note are carried out using the same image extraction device.

8. The method of claim 7, wherein the step of extracting one or more initial images comprises:
   extract a front side initial image in a first initial position;
   extract a front side initial image in a second initial position;
   extract a back side initial image in a first initial position; and
   extract a back side initial image in a second initial position.

9. The method of claim 8, wherein the step of extracting one or more subsequent images comprises:
   extract a front side subsequent image in a first subsequent position;
   extract a front side subsequent image of the counterfeit bank note in a second subsequent position;
   extract a back side subsequent image of the counterfeit bank note in a first subsequent position; and
   extract a back side subsequent image of the counterfeit bank note in a second subsequent position.

10. The method of claim 9, wherein the step of comparing comprises comparing each subsequent image in each subsequent position a plurality of times to a corresponding initial image.

11. The method of claim 7, wherein the one or more initial images of said one of the plurality of bank notes include a unique characteristic that is specific to said one of the plurality of bank notes, and wherein the unique characteristic includes other information besides a serial number of the said of the plurality of bank notes.

12. The method of claim 7, wherein the step of comparing comprises:
   analyzing image characteristics using a Euclid distance formula; and
   determining that the one or more initial images and the one or more subsequent images have a Euclid distance near zero, wherein the range of similarity includes having a Euclid distance near zero.

13. The method of claim 7, wherein the steps of the method are stored on a non-transitory computer-readable medium as one or more instructions for tracing bank notes, wherein the one or more instructions, when executed by one or more processors, cause the one or more processors to perform the steps of the method.

14. The automatic teller machine of claim 1, wherein the one or more initial images of the one of the plurality of bank notes include a unique characteristic that is specific to said one of the plurality of bank notes, and wherein the unique characteristic includes other information besides a serial number of said one of the plurality of bank notes.

* * * * *